United States Patent
Kwok et al.

(10) Patent No.: US 6,261,476 B1
(45) Date of Patent: Jul. 17, 2001

(54) HYBRID POLISHING SLURRY

(75) Inventors: Doris Kwok, Fishers; James Kent Knapp, Pittsboro, both of IN (US)

(73) Assignee: Praxair S. T. Technology, Inc., New Haven, CT (US)

( * ) Notice: Subject to any disclaimer, the term of this patent is extended or adjusted under 35 U.S.C. 154(b) by 0 days.

(21) Appl. No.: 09/532,122

(22) Filed: Mar. 21, 2000

(51) Int. Cl.$^7$ .............................. C09K 13/00; C23F 1/00
(52) U.S. Cl. ............................ 252/79.1; 106/3; 216/89; 252/79.2
(58) Field of Search ................... 252/79.1, 79.2, 252/79.4, 79.3; 438/692, 693; 216/88, 89; 106/3

(56) References Cited

U.S. PATENT DOCUMENTS

| | | | |
|---|---|---|---|
| 4,225,349 | 9/1980 | Koshiyama et al. | 106/3 |
| 4,696,697 | 9/1987 | Kitano et al. | 106/3 |
| 4,705,566 | 11/1987 | Senda et al. | 106/3 |
| 4,769,046 | 9/1988 | Senda et al. | 51/293 |
| 4,956,015 | 9/1990 | Okajima et al. | 106/3 |
| 5,226,955 | 7/1993 | Owaki | 106/3 |
| 5,366,542 | 11/1994 | Yamada et al. | 106/3 |
| 5,575,837 | 11/1996 | Kodama et al. | 106/3 |
| 5,693,239 | 12/1997 | Wang et al. | 216/88 |
| 5,733,819 | 3/1998 | Kodama et al. | 438/692 |
| 5,968,239 | * 10/1999 | Miyashita et al. | 252/79.2 X |
| 5,997,620 | * 12/1999 | Kodama et al. | 216/89 X |
| 6,159,077 | * 12/2000 | Sabia et al. | 216/89 X |
| 6,190,443 | * 2/2001 | Ohashi et al. | 216/89 X |

FOREIGN PATENT DOCUMENTS

WO9823697   4/1998   (WO) .

\* cited by examiner

*Primary Examiner*—William Powell
(74) *Attorney, Agent, or Firm*—Blake T. Biederman

(57) ABSTRACT

A hybrid slurry mixture that polishes substrates' surfaces. The hybrid slurry includes, by weight percent, 1 to 30 primary polishing particles, 1 to 50 dispersed colloidal particles, 1 to 40 oxidizer and balance water. The primary polishing particles are metal compounds selected from the group consisting of oxides, nitrides, carbides and borides. The primary polishing particles have a particle size from about 0.1 to 2 μm mean diameter. The dispersed colloidal particles are at least one oxide selected from the group consisting of alumina and silica. The dispersed colloidal particles have a particle size from about 2 to 500 nm mean diameter.

18 Claims, No Drawings

HYBRID POLISHING SLURRY

TECHNICAL FIELD

This invention relates to the field of polishing slurries. In particular, this invention relates to the field of polishing slurries for producing smooth surfaces for computer hard disks.

BACKGROUND ART

The typical manufacturing process for memory hard disk media involves plating an aluminum disk substrate with a layer of nickel phosphorus and polishing the nickel alloy to obtain a smooth and flat surface. This polished nickel alloy's surface is suitable for the application of a hard disk's magnetic storage layer. The computer industry's requirements for increased storage capacity on hard disk drives has necessitated a substantial increase in areal density, i.e., data storage capacity per unit surface area, on the disk media. This demand for hard disks with higher areal densities has required several manufacturing improvements that include enhanced plating uniformity, reduced surface roughness after polishing and enhanced texturing characteristics. The polishing process is an important factor that influences many of these new requirements.

In addition to these new manufacturing requirements, significant improvements in surface inspection methodology have allowed disk manufacturers to inspect for smaller surface defects. This advanced inspection technology has led to optimization of polishing parameters such as polishing time, pressure and revolution rate of a polishing machine's upper and lower tables. Optimizing these parameters typically reduces surface defects that can occur during polishing. This technique however requires a high degree of expertise; and it is quite time consuming. Other advances have been made in the area of consumables: polishing pads, abrasive slurry, and cleaning materials.

Although these techniques all reduce surface defects, surfaces with various types of defects do result in uneven plating of the magnetic layer. For example, surface defects on the magnetic layer such as nodules that reduce the clearance between the magnetic head and the magnetic layer to less than 0.2 $\mu$m may damage or even crush the magnetic head. Other defects such as scratches and pits may result in errors in reading or writing information on hard disks.

Manufacturers have experienced limited success with eliminating errors that arise from conventional aluminum oxide slurries. These high-tech slurries use aluminum oxide of various surface area (5 to 50 m$^2$/g) and size distribution (0.1 to 10 $\mu$m) as the polishing agent. Unfortunately, these slurries' large particle sizes cause micro-scratches, micro-pits and nodules on nickel-plated substrates' surface. There are several possible causes for these defects including: 1) the grinding action of aluminum oxide on substrate surfaces introduces polish scratches; 2) the accumulation of unwanted wastes from the oxidized substrate and nickel debris mixed with the water to reduce the effectiveness of the injected polishing slurry; and 3) agglomeration of the abraded debris in the pores of the polishing pads scratches and pits the substrate's surface. In view of all these factors, it is difficult for disk manufacturers to achieve their required smooth surface, i.e., a roughness (peak-to-valley height) of less than 3 Å or even 6 Å with conventional alumina-based slurries.

Manufacturers have suggested that surface defects form primarily during the nickel plating process. In an attempt to correct these plating defects, most proposed solutions have increased the polishing rate to reduce or eliminate surface irregularities. For example, chemical additives such as chelating agents and oxidizers promote oxidation and accelerate the polishing rate of slurries. Others have used smaller or softer alumina-based abrasive particles to minimize polish scratches on substrate surfaces.

These attempts for eliminating surface irregularities have primarily focused on increasing the rate of chemical etching and mechanical abrasion of the nickel plated on the aluminum substrate, for example, by applying a high polishing rate. It is however necessary to increase the particle size of aluminum oxide in order to provide sufficient mechanical abrasion. Unfortunately, the use of large particles also tends to roughen the polished surfaces. Thus, it is often difficult, if not impossible, to achieve a high polishing rate and low roughness simultaneously. Other slurry manufacturers have used strong oxidizers or accelerators in slurries to increase the oxidizing rate of nickel plated on aluminum substrates. These chemically aggressive slurries may, however, cause pitting on the substrate surfaces and result in an undesirable buildup of slurry and nickel debris in the polishing pads. An excessive build up of unwanted waste in polishing pads leads to: defects on substrate surfaces; longer pad scraping between polishing cycles; and reduced pad life.

Wang et al., in U.S. Pat. No. 5,693,239 disclose the use of submicron alumina for chemical-mechanical polishing. Okajima et al., in U.S. Pat. No. 4,956,015 combine $\alpha$-alumina with boemite for improved polishing removal rates. As far as known, these slurries lack the combination of removal rate and performance demanded by current disk manufacturers.

Furthermore, there have been other unsuccessful attempts to prevent the formation of surface defects by using smaller and softer conventional abrasives powders; these slurries however, often form pits and nodules due to their slow polishing rates. In addition, prior attempts to polish nickel-plated aluminum substrates include using a silica-only slurry. For example, PCT Pat. Pub. No. 98/23697 discloses polishing with slurries that contain 5 weight percent silica. Similarly, U.S. Pat. No. 5,733,819 to Kodama et al. discloses the use of fumed silica with malic acid. Finally, Kodama et al., in U.S. Pat. No. 5,575,837, disclose a silica gel with a relatively strong persulfate accelerator for increasing polishing removal rates. Although these fumed silica processes obtain a smooth surface, their polishing rate are too slow for many commercial applications—even when adding a large amount of oxidizers or accelerators to the slurry. Furthermore, these slurries can become too acidic for safe handling by operators on a daily basis.

It is an object of this invention to provide a polishing slurry for producing flat-smooth surfaces.

It is a further object of this invention to provide a polishing slurry for disk manufacturers to achieve a surface roughness of less than 6 Å.

It is a further object of this invention to produce a smooth surface with removal rates analogous to alumina-based slurries.

SUMMARY OF THE INVENTION

A hybrid slurry mixture that polishes substrates' surfaces. The hybrid slurry includes, by weight percent, 1 to 30 primary polishing particles, 1 to 50 dispersed colloidal particles, 1 to 40 oxidizer and balance water. The primary polishing particles are metal compounds selected from the group consisting of oxides, nitrides, carbides and borides. The primary polishing particles have a particle size from about 0.1 to 2 μm mean diameter. The dispersed colloidal particles are at least one oxide selected from the group consisting of alumina and silica. The dispersed colloidal particles have a particle size from about 2 to 500 nm mean diameter.

DETAILED DESCRIPTION

The present invention includes a hybrid polishing composition containing a metal compound as the primary polishing agent and a sol or gel of alumina or silica as the secondary-polishing agent. Polishing with this combination of primary polishing particles and dispersed colloidal particles improves substrates' surface characteristics and minimizes or eliminates all surface defects. This hybrid polishing composition's bimodal size distribution is most advantageous for polishing rigid hard disks plated with nickel and nickel alloys such as, nickel-phosphorus alloys. It achieves a surface roughness of less than 3 Å with commercially acceptable nickel removal rates. This hybrid slurry reduces the number of defective products and the cost of production. When using colloidal silica, the nickel debris produced from the chemical etching and the mechanical abrasion of the substrate surface react or adsorb onto silica particles' surface. Thus, since polishers continuously remove the silica as a wash product, it also removes adsorbed nickel debris. Therefore, this process unexpectedly reduces pad scraping between polishing cycles and increases production capacity.

Effective primary polishing particles include at least one metal compound selected from the group of oxides, nitrides, carbides and borides. In particular, at least one metal oxides of silica, alumina, ceria, zirconia, titania provide excellent polishing performance. Most advantageously, the primary polishing particles are alumina particles. In particular, alumina particles predominately in the form of an alpha crystal structure form the most effective primary particles.

The primary particle concentration in the polishing composition advantageously is in the range of about 1 to 30 percent by weight, most advantageously, about 5 to 25 percent by weight. The primary particles have a particle diameter in the range of about 0.1 to 2.0 μm mean diameter. Advantageously, the primary polishing particles have a particle diameter of about 0.1 to 1 μm mean diameter and most advantageously, about 0.1 to 0.3 μm mean diameter. The surface area of the primary polishing particles typically have a surface area of about 4 to 100 $m^2/g$. Advantageously, this has a surface area of about 5 to 60 $m^2/g$ and most advantageously, about 30 to 40 $m^2/g$ for effective polishing.

The dispersed colloidal particles advantageously originate from a stable dispersion or sol of discrete particles of at least one oxide selected from the group consisting of alumina and silica. Most advantageously, the dispersed particles are silica. Amorphous silica forms a particularly effective colloidal dispersion. These silica dispersions may originate from hydrolysis of silicon compounds, neutralizing soluble silicates with acids, electrodialysis, ion exchange, etc.

The colloidal dispersion typically has a particle diameter in the range of about 2 to 500 nm mean diameter. Advantageously, it has a particle diameter of about 10 to 200 nm mean diameter. Most advantageously, about 20 to 60 nm mean diameter for smooth polishing with acceptable removal rates. The dispersed colloidal particle's surface area advantageously falls within the range of about 60 to about 250 $m^2/g$, most advantageously, about 65 to 90 $m^2/g$. The sol or gel of alumina or silica has a solid concentration in the range of about 1 to 50 percent by weight-it's possible to add this component directly to a polishing slurry under agitation.

Advantageously, the colloidal alumina or silica is in the range of about 2 to 50 percent by weight and most advantageously about 10 to 40 percent by weight.

The resulting slurry also contains a chemical oxidizer, which accelerates the polishing removal rate. Acceptable chemical accelerators include: nitric acid, nickel nitrate, aluminum nitrate and magnesium nitrate. Advantageously, the slurry contains about 1 to 40 weight percent oxidizer. Most advantageously, it contains about 1 to 10 weight percent oxidizer.

The advantageous blending ratio of primary alumina particles to colloidal silica particles is about 1-to-1 to 1-to-5 by weight. Furthermore, a dilution ratio of about three parts water to one part slurry advantageously dilutes the slurry at the point-of-use. Final solids content at the point-of-use most advantageously ranges between about 5 and 15 percent by weight, depending on the application.

Polishing with softer and smaller particle size alumina-based slurries obtains smoother substrate surfaces. Experimental data show that very fine alumina slurries (0.05 to 0.3 μm mean diameter) achieve a surface roughness of less than or equal to about 3.5 Å.

EXAMPLE

Nickel-phosphorus plated aluminum substrates of 95 mm outer diameters were polished with a slurry consisting of three samples. Comparative Sample A (alumina only) contained: 100 g aluminum oxide, 33 g aluminum nitrate, 0.77 g aluminum sulfate and 365 g de-ionized water. Comparative Sample B (silica only) contained 100 g silica, 62 g aluminum nitrate and 108 g de-ionized water.

Sample 1 contained 100 g aluminum oxide, 100 g silica, 33 g aluminum nitrate, 0.77 g aluminum sulfate and 465 g de-ionized water. Sample 2 contained: 100 g alumina, 450 g silica, 33 g aluminum nitrate, 0.77 g aluminum sulfate and 820 g de-ionized water. The alumina of Samples A, 1 and 2 had a particle size of 0.2 μm (mean diameter) and a surface area of 40 $m^2/g$. The silica of Samples B, 1 and 2 had a particle size of 0.04 μm (mean diameter) and a surface area of 70 $m^2/g$. The polisher used was a Strasbaugh 6EE—an automatic polisher that laps on both sides. The polisher had a polyurethane-based polishing pad mounting on the upper and lower tables of the polishing machine. The duration of the polishing cycle was 10 minutes by mutually sliding the disks and the two polishing pads under a net downforce of 80 $g/cm^2$ and by injecting 350 ml/min of the above-mentioned slurry between the disks and the polishing pads. Upon completion of the polishing cycle, the disks were removed from the polisher and cleaned in a Vtech disk cleaner to remove any residual particles attached onto the surfaces of the disk. The weight of the disk was measured, and the average polishing rate was determined from the reduction in weight. The roughness of the disk was measured using a Veeco TMS 2000 laser scattering device in which the surface measurements of 6000 points on the disk were taken to compute the average disk roughness. The surface of the disk was also inspected visually by microscope for various types of surface defects. The test results are shown in Table 1.

TABLE 1

Polishing Test Results

| Sample | Al$_2$O$_3$:SiO$_2$ Weight | Polishing rate μm/min/side | Roughness Å | Surface Defects |
|---|---|---|---|---|
| A | 1:0 | 8.64 | 3.4 | Micro-pits and micro scratches |
| B | 0:1 | 1.88 | 2.0 | Orange-peel defects |
| 1 | 1:1 | 8.64 | 3.2 | Very few micro-pits, no scratches |
| 2 | 1:5 | 4.83 | 2.4 | No pits or scratches |

Hybrid Samples 1 and 2 had different water dilution ratio at point-of-use. The dilution ratio of Sample 2 was reduced to match the polishing rate of Sample 1 in order to compare surface quality of disks polished with these two samples.

The hybrid slurries readily produce flat-smooth surfaces having a surface roughness of less than about 4 Å. Furthermore, the hybrid slurries produce smooth surfaces with removal rates analogous to alumina-based slurries. For example, primary alumina/colloidal silica slurries remove electrodeposited nickel-phosphorus coatings at a rate of at least about 7.5 μm/min/side.

Although the invention has been described in detail with reference to a certain preferred embodiment, those skilled in the art will recognize that there are other embodiments of the invention within the spirit and the scope of the claims.

What is claimed is:

1. A hybrid slurry mixture for polishing surfaces comprising by weight percent about 1 to 30 primary polishing particles, said primary polishing particles being at least one metal compound selected from the group consisting of oxides, nitrides, carbides and borides and said primary polishing particles having a particle size from about 0.1 to 2 μm mean diameter, about 1 to 50 dispersed colloidal particles being at least one oxide selected from the group consisting of alumina and silica, said dispersed colloidal particles having a particle size from about 2 to 500 nm mean diameter, about 1 to 40 oxidizer and balance water.

2. The hybrid slurry mixture of claim 1 wherein said primary polishing particles have a particle size from about 0.1 to 1 μm mean diameter.

3. The hybrid slurry mixture of claim 1 wherein said dispersed colloidal particles have a particle size from about 10 to 200 nm mean diameter.

4. The hybrid slurry mixture of claim 1 wherein said oxidizer is selected from the group consisting of nitric acid, nickel nitrate, aluminum nitrate and magnesium nitrate.

5. The hybrid slurry mixture of claim 1 wherein said primary polishing particles have a surface area from about 4 to 100 m$^2$/g and said dispersed colloidal particles have a surface area from about 60 to 250 m$^2$/g.

6. The hybrid slurry mixture of claim 1 wherein said primary polishing particles are alumina and said dispersed colloidal particles are silica.

7. A hybrid slurry mixture for polishing surfaces comprising by weight percent about 5 to 25 primary polishing particles, said primary polishing particles being at least one oxide selected from the group consisting of silica, alumina, ceria, zirconia and titania, said primary polishing particles having a particle size from about 0.1 to 1 μm mean diameter and a surface area from about 4 to 100 m$^2$/g, about 2 to 50 dispersed colloidal particles, said dispersed colloidal particles being at least one oxide selected from the group consisting of alumina and silica, said dispersed colloidal silica having a particle size from about 10 to 200 nm mean diameter and a surface area from about 60 to 250 m$^2$/g, about 1 to 40 oxidizer and balance water.

8. The hybrid slurry mixture of claim 7 wherein said primary polishing particles have a particle size from about 0.1 to 0.3 μm mean diameter.

9. The hybrid slurry mixture of claim 7 wherein said dispersed colloidal particles have a particle size from about 20 to 60 nm mean diameter.

10. The hybrid slurry mixture of claim 7 wherein said oxidizer is selected from the group consisting of nitric acid, nickel nitrate, aluminum nitrate and magnesium nitrate.

11. The hybrid slurry mixture of claim 7 wherein said primary polishing particles have a surface area from about 5 to 60 m$^2$/g and said dispersed colloidal particles have a surface area from about 65 to 90 m$^2$/g.

12. The hybrid slurry mixture of claim 7 wherein said primary polishing particles are alumina.

13. The hybrid slurry mixture of claim 7 wherein said dispersed colloidal particles are silica.

14. A hybrid slurry mixture for polishing surfaces comprising by weight percent about 5 to 20 alumina polishing particles, said alumina polishing particles having a particle size from about 0.1 to 0.3 μm mean diameter and a surface area from about 5 to 60 m$^2$/g, about 10 to 40 silica, said silica having a particle size from about 20 to 60 nm mean diameter and a surface area from about 65 to 90 m$^2$/g, about 1 to 10 oxidizer and balance water.

15. The hybrid slurry mixture of claim 14 wherein said oxidizer is selected from the group consisting of nitric acid, nickel nitrate, aluminum nitrate and magnesium nitrate.

16. The hybrid slurry mixture of claim 14 wherein said alumina polishing particles have a surface area from about 30 to 40 m$^2$/g.

17. The hybrid slurry mixture of claim 14 having a ratio of said alumina to said silica of about 1 to 1 to 1 to 5 by weight.

18. The hybrid slurry mixture of claim 14 wherein the slurry mixture removes electrodeposited nickel-phosphorus coatings at a rate of at least about 7.5 μm/min/side and produces a finished surface roughness of less than about 4 Å.

* * * * *